Sept. 15, 1925.  
H. A. FARRAND  
CONVEYING MECHANISM  
Filed Oct. 7, 1924  
1,553,373  
3 Sheets-Sheet 1
Fig. 1.
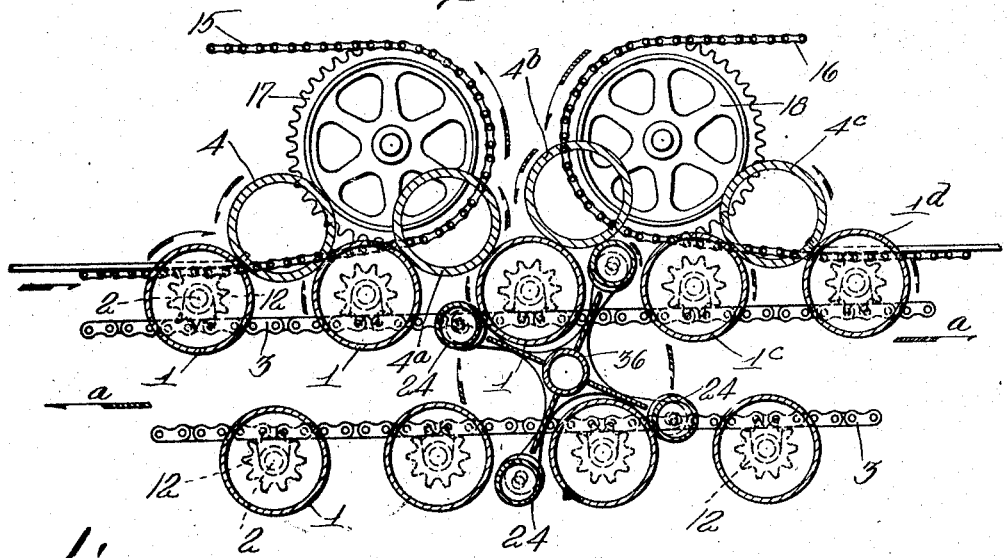
Fig. 2.
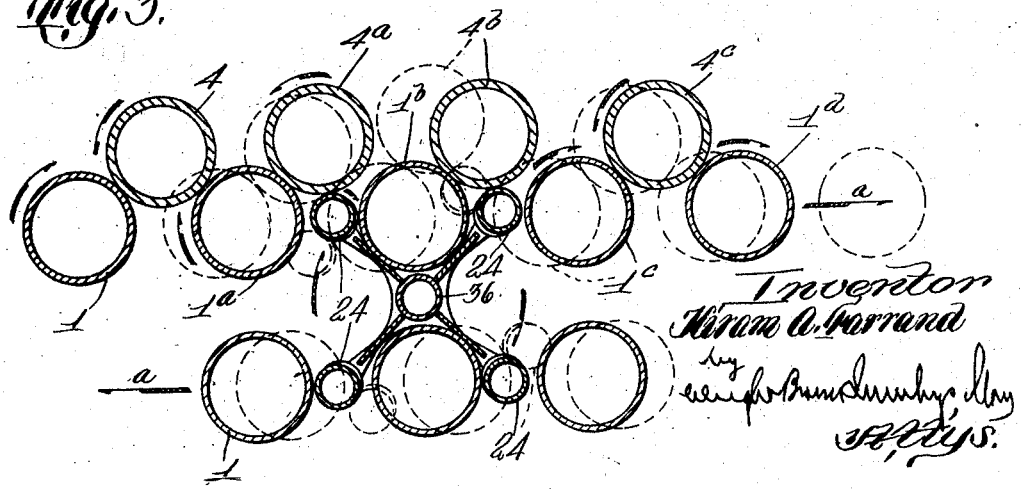
Fig. 3.
Inventor  
Hiram A. Farrand

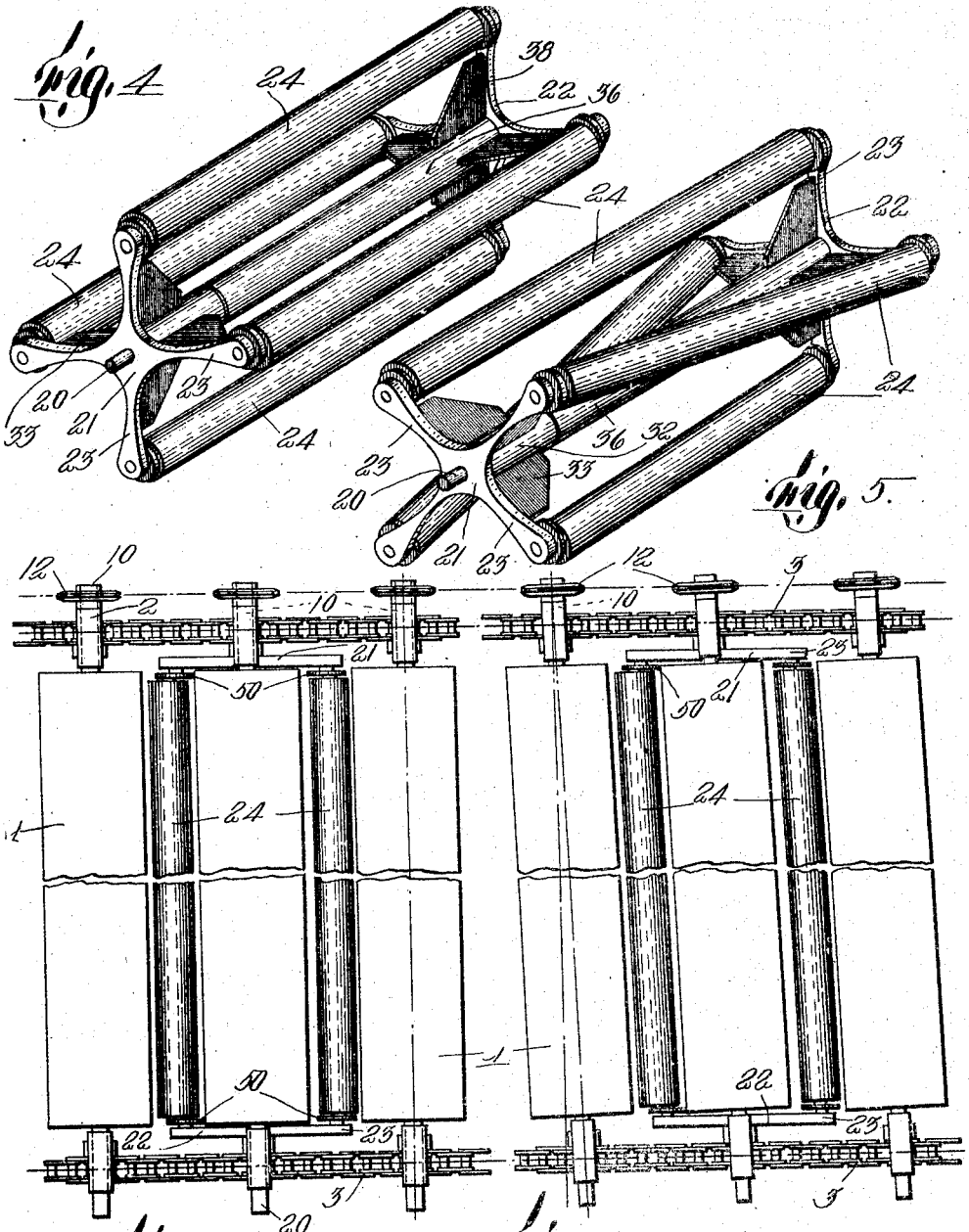

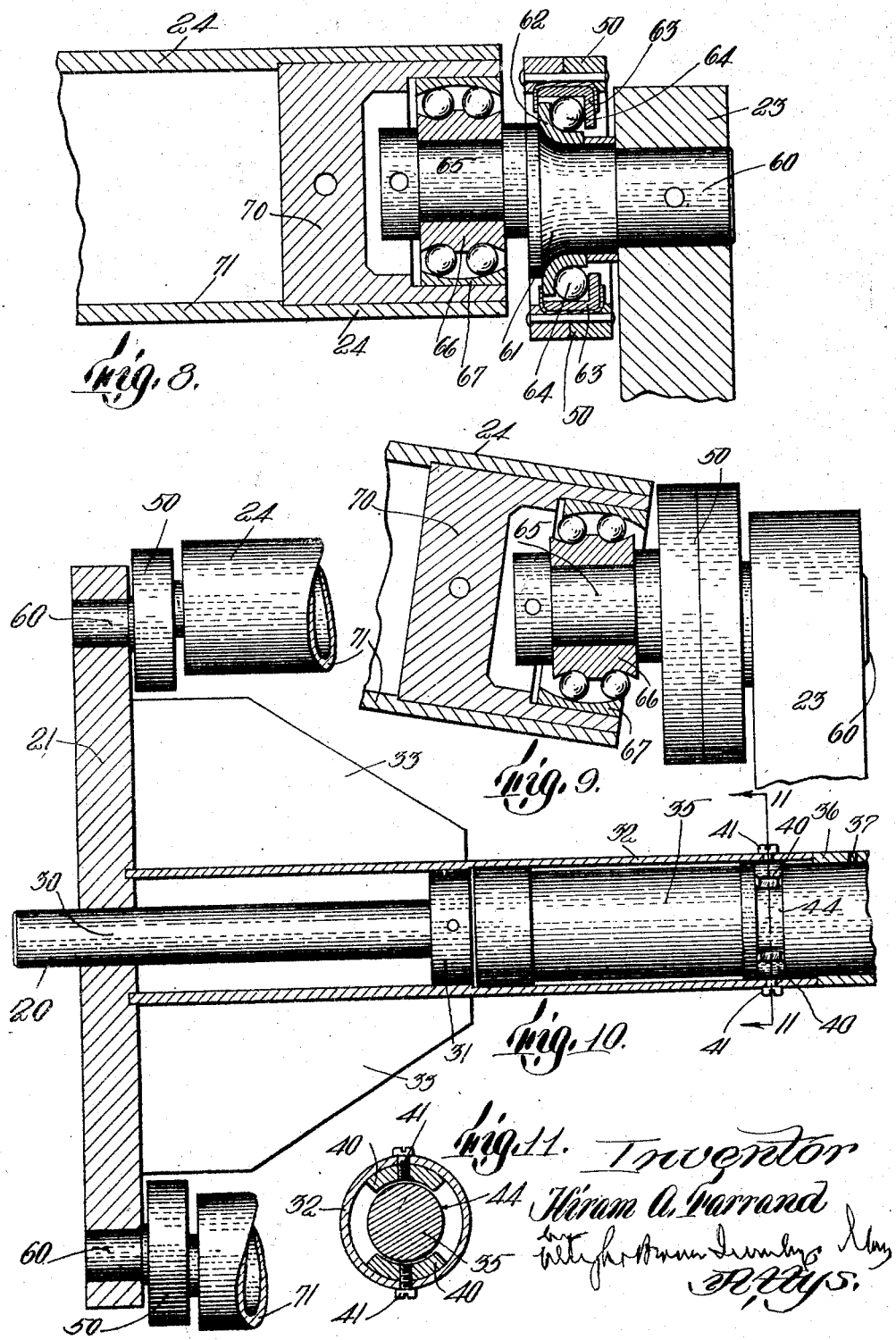

Patented Sept. 15, 1925.

1,553,373

UNITED STATES PATENT OFFICE.

HIRAM A. FARRAND, OF BERLIN, NEW HAMPSHIRE, ASSIGNOR TO BROWN COMPANY, OF BERLIN, NEW HAMPSHIRE, A CORPORATION OF MAINE.

CONVEYING MECHANISM.

Application filed October 7, 1924. Serial No. 742,183.

*To all whom it may concern:*

Be it known that I, HIRAM A. FARRAND, a citizen of the United States, residing at Berlin, in the county of Coos and State of New Hampshire, have invented new and useful Improvements in Conveying Mechanism, of which the following is a specification.

This invention relates to conveying mechanism and while not limited thereto has been particularly designed for conveying cylindrical objects such as fiber tubes formed up from wet pulp through a drier.

In this drier the tubes are supported between pairs of rollers which are given a bodily movement of translation through the drier and at the same time are rotated so that the tubes are rotated by their frictional contact with the rollers. In order that motion of translation may be imparted to the tubes, the rollers are supported at each end by bearings, the bearings at the corresponding ends of each of the rollers being fixed to endless chains which are passed over suitable sprocket wheels rotated in unison.

The rollers are rotated by means of chain drives engaging sprocket wheels fixed to rotate with the rollers at one end of each. As the drier is of very considerable length, as in the neighborhood of 200 feet, it has been found to be impracticable to attempt to rotate all the rollers of that stretch of the series supporting tubes with the same driving chain. This is due to the alternate stretch and slackening unavoidable in the driving of such a chain causing such irregular rotation of the rollers that the pulp tube which is comparatively soft and easily deformable, particularly at the wet end of the drier, would be likely to be injured. It may also be desirable to rotate the article in different lengthwise portions of the drier at different velocities. For these reasons the stretch of tube-supporting rollers is divided into a plurality of units rotated independently of each other by separate chain drive mechanisms, the rollers passing in turn from cooperation with one to a succeeding driving mechanism as they are translated. With this construction, however, the rollers at adjacent ends of successive units at any one time may have relatively different angular velocities even though the successive drive chains are driven from sprocket wheels having the same velocities, those rollers adjacent to the driven portion of the drive chain of each unit being more uniformly rotated than those more remote from the driven portion where the alternate stretch and slackening of the length of chain causes alternately slower and faster rotation. Under these conditions as well as when the drive sprockets are rotated at different velocities, it is important that the tube shall be prevented from having frictional driving contact with the rollers in more than one driven unit at one time since otherwise the tubes would necessarily rub on one or the other of the rollers driven at different angular velocities and would be liable to suffer injury.

The present invention, therefore, provides mechanism by which it is rendered impossible for a tube to be in frictional contact at the same time with both of any pair of adjacent rollers driven from different drive chains either directly or by frictional contact through other tubes. This is done by interposing between adjacent rollers, as they are passed from one to the succeeding driving unit, an idle roller always held out of frictional engagement with the driven rollers and which is raised to lift the tube from one or the other of such driven rollers until such time as both assume positions in the succeeding driving unit and are thus rotated at substantially the same velocity, whereupon the idle roller is withdrawn.

Provision is also made by which the idle roller is moved into and out of operative position automatically by the translation of the driven rollers through the drier, and provision is also made by which it can conform to any irregularities in the relative translational movements of opposite ends of the driven rollers.

For a more complete understanding of this invention, reference may be had to the accompanying drawings in which Figure 1 is a diagrammatic view illustrating the use of successive rotary drive units.

Figure 2 is a fragmentary somewhat diagrammatic section through a tube conveyor system at the adjacent ends of successive rotary driving units.

Figure 3 is a somewhat diagrammatic section of a similar portion of one system illustrating successive positions of the tubes and rollers.

Figure 4 is a perspective of the idle roller device in normal condition.

Figure 5 is a similar view showing the device distorted as when the traverse at opposite ends of the rollers has been unequal so that their axes do not lie at right angles to their path of translation.

Figures 6 and 7 are fragmentary plans showing the idle roller device in position, Figure 6 showing it in the condtion of Figure 4 and Figure 7 showing it in the condition of Figure 5.

Figure 8 is a detail section showing the bearings for the idle roller when its mounting is in normal position as in Figure 3.

Figure 9 is a detail partly in elevation and partly in section showing the same mechanism in the distorted condition of Figure 5.

Figure 10 is a detail partly in section of another portion of the idle roller device.

Figure 11 is a detail section on line 11—11 of Figure 9.

Referring first to Figures 1 and 5, at 1, 1ᵃ, 1ᵇ and 1ᶜ are indicated rotatable rollers on which the tubes or other cylindrical articles to be dried are carried. Each of these rollers is journaled at opposite ends in bearing blocks 2 and these bearing blocks are fixed to endless carrier members herein shown as chains 3, the upper and lower stretches of each chain being in parallel spaced relation, the articles to be dried, as at 4, being supported by the rollers on the upper stretch only, the rollers on the lower stretch being idle and returning from the article exit end of the drier to the entrance end where the articles are introduced. There may be several tiers of such roller systems in one drier.

A chain 3 is positioned at each end of the rollers, as shown best in Figures 5 and 6, and suitable means (not shown) are provided for driving this chain to give the supporting rollers 1 a translational movement through the drier as shown by the arrows a. At one end of each roller its supporting shaft 10 is extended beyond the bearing block 2 and has fixed thereto a sprocket wheel 12, this sprocket wheel being designed to be engaged by any one of a plurality of driving chains 15 and 16, the motion of these chains serving to impart rotation to the rollers. A plurality of driving chains is employed since the total length of the drier is very considerable, and, even if it is desired to rotate them at the same velocity, it is impracticable on account of the alternate stretch and slackening of chain drives to drive such a large number of supporting rollers as is necessary over such an extended stretch by a single chain drive. In Figure 1 three such rotary driving mechanisms have been indicated.

The sprocket chains 15 and 16 pass over end sprocket wheels 17 and 18, respectively, as shown in Figure 2, one sprocket wheel for each drive chain being rotated by any suitable source of power. If it be assumed that the chain 15, as shown in Figure 1, is being driven from the sprocket wheel 17 at the right hand end of the chain and that the sprocket chain 16 is being driven by power applied to a sprocket wheel (not shown) at the remote end of the loop of this chain, it is found that the sprocket wheel 18 will be driven more or less irregularly, due to the alternate stretching and slackening of the chain 16, whereas the sprocket wheel 17 being driven directly from the source of power is given uniform velocity. If now the article to be dried rests upon a roller having motion imparted thereto by the chain 15 and at the same time on a neighboring roller deriving its motion from the chain 16 adjacent to the sprocket wheel 18, the two supporting rollers both imparting frictional rotational forces to the article will not act in time thereon, consequently slipping between the article and one or the other supporting roller will result and particularly where the articles are readily deformable they are likely to be injured thereby.

It is therefore important that the articles shall never be in frictional contact with a pair of supporting rollers which are driven either directly or through frictional contact with other articles supported thereby from more than one rotational drive mechanism. This is accomplished in the present invention by means acting automatically as the supporting rollers leave one rotational driving unit out of cooperating engagement with its drive mechanism and approach the succeeding unit to raise the article being dried out of contact with one of the supporting rollers until such time as both these rollers become a part of the succeeding unit and are receiving their rotational impulses from the succeeding driving mechanism.

The device for accomplishing this is shown detached in Figures 3 and 4 and details thereof in Figures 7 to 10. As shown it comprises a shaft 20 mounted for free rotation between the upper and lower stretches of the drive chain 3. This shaft carries adjacent to opposite ends spiders 21 and 22 each having outwardly directed arms 23 for pivotally supporting idle rollers 24 which pass up one by one between adjacent rotatable rollers 1, each of these rotatable rollers passing between adjacent arms 23 as shown in Figures 1 and 2 and by their motion of translation turning the spiders on the axis of the shaft 20 as a center.

It may sometimes happen that the chains 3 at opposite ends of the rotatable rollers may fall slightly out of step as by one slipping a tooth on its driving sprocket, whereupon the rollers become slightly turned from their normal position extending at right angles to their line of translational movement, this being shown in Figure 6. In order that the article-raising device may conform to such a position of the rotatable rollers, provision is made by which the frame comprising the spiders and the idle rollers may be distorted as to permit the idle rollers to maintain parallel relation with the rotatable rollers even though the rotatable rollers may assume incorrect angular positions such as is shown in Figure 6. For this purpose the spiders 21 and 22 are permitted a relative rotation on the shaft 20, the idle rollers also being supported in a manner which permits such relative angular movement of the spiders without cramping or otherwise interfering with the free rotation of the idle rollers.

As shown in Figure 9, the shaft 20 is made in two parts, one of the parts, as 30, extending through a central opening in the spider 21 and its opposite end being formed as a head 31 which is fixed in a tube 32 extending therebeyond and held in perpendicular relation to the plane of the spider 21 by means of the plates or fins 33. Within the projecting end of the tube 32 is positioned a shaft portion 35 rotatable therein and fixed to a tubular portion 36 as by a pin 37, the tubular portion 36 being fixed to the spider 22, plates or fins 38 being employed to retain it in perpendicular relation to the plane of this spider. The projecting end of the shaft 35 may be fixed axially within the tube 32 and for this purpose, as shown in Figure 10, a pair of arcuate shoes 40 fixed by screws 41 to the inner face of the tube 32 engage in an annular recess 44 in the shaft 35.

It is important that the idle rollers should be held out of contact with the rotatable rollers between which they pass in order that the articles supported thereby and by one of the adjacent rotatable rollers may have rotational effort imparted thereto only through its supporting rotatable roller. For this purpose the idle rollers are held out of contact with the rotatable rollers as by means of friction wheels 50 journaled at the ends of the spider arms 21 and 22, these rollers being of somewhat larger diameter than the idle rollers and positioned somewhat nearer to the axis of the shaft 20. With this construction the friction wheels 50 may come in contact with the rotatable rollers but these act to hold the idle rollers always out of contact therewith.

The manner of supporting the idle rollers for rotation notwithstanding the distortion of their supporting frame by relative angular motion of the spiders 21 and 22 is shown best in Figures 7 and 8. At the end of each of the spider arms 23 is fixed a shaft 60 having a concentric portion of increasing diameter as at 61 on which is mounted the inner race member 62 of a ball bearing, the outer race member as shown at 63 being fixed to the inner face of the corresponding friction wheel 50. At 64 are shown the balls positioned between these race members. Inwardly of the friction wheels 50 the shaft 60 has an eccentrically arranged portion of reduced diameter 65 in which is seated the inner race member 66 of a universal ball bearing, the outer race member 67 of which is fixed within the end of the idle roller 24. The inner face of the race member 67 is curved to permit the roller 24 to tilt out of axial alinement with the shaft portion 65 as shown in Figure 8 without destroying its ball bearing connection therewith. As shown the race member 67 is seated within the recessed end of a block 70 seated in the end of a tube 71 which forms the body portion of the idle roller 24.

Referring again to Figure 2, it will be seen that the drive chain 15 is in driving relation to the sprocket 12 of the left hand rotatable roller 1, but is out of driving connection with its next adjacent right hand sprocket on the roller 1ª. The article 4 supported between these two rotatable rollers 1 and 1ª is therefore driven by its frictional engagement with the roller 1 as shown by the arrow, and imparts a rotation to the next adjacent roller 1ª on which it rests. This roller 1ª also helps to support another article 4ª, which is driven by its frictional engagement with its supporting roller 1ª and also drives by frictional engagement therewith its supporting roller 1ᵇ.

Referring now to the rotatable roller 1ᵈ, it will be noted that this is driven from the chain 16 which engages its sprocket wheel 12. The rotatable roller next to the left at 1ᶜ is not driven directly by this chain 16, but is driven frictionally through the article 4ᶜ, which rests on both the rotatable rollers 1ᶜ and 1ᵈ. It will thus be seen that the supporting roller 1ᵇ and the supporting roller 1ᶜ, which are next adjacent to each other, derive their rotary motions from two different driving units, the roller 1ᵇ deriving its rotation through frictional contact with articles supported thereby and other rotatable rollers from the chain 15, and the roller 1ᶜ deriving its rotation through frictional engagement with the article supported on a roller driven by the chain 16. As the adjacent portions of these chains are not driven in synchronism since this portion of the chain 16 is remote from its driving source and is more or less non-uniformly driven and this portion of the chain 15 is near its driving source and is more uniformly rotated, it is important that no article shall be in contact with both the rollers 1^b and 1^c at the same moment. Of course if the rotating mechanisms are intended to be driven at different velocities, as hereinbefore mentioned, the avoidance of imparting rotating effort to one article from more than one mechanism at a time is of even more importance. The spider with its supporting idle rollers prevents such contact by raising the article 4^b out of contact with one or the other of these supporting rollers. As shown it is out of contact with the supporting roller 1^c, but it may take this position or it may contact with the roller 1^c and be out of contact with the roller 1^b, sometimes one action occurring and sometimes the other, it being immaterial which. As the idle roller on which the article 4^b is supported is always out of contact with the rotatable rollers 1^b and 1^c, as hereinbefore pointed out, it may be rotated freely by frictional engagement with the article 4^b which is driven by its frictional engagement with that particular supporting roller either 1^b or 1^c with which it happens to be in contact.

As the chain 3 continues in its traverse the roller 1^c is brought to the position of the roller 1^d and the roller 1^b to the position of the roller 1^c. The roller 1^b passing between the arms of the spiders causes the frame comprising these spiders to rotate, thus withdrawing the idle roller from between the supporting rollers 1^b and 1^c and finally permitting the article 4^b to contact with both the driving rollers 1^b and 1^c. By the time this has occurred, however, the article 4^a has been raised upwardly from contact with one of the rollers 1^a or 1^b so that the roller 1^b is no longer receiving rotational effort from the chain 15. The entire rotational effort on the article 4^b is now from the chain 16 either directly or through the frictional effort transmitted between other supporting rollers and other articles thereto.

In Figure 2 the successive positions of the articles and rollers are indicated by dotted and solid lines. For example, the article 4 is shown in dotted lines as supported by the rollers 1 and 1^a, and the article 4^a by the rollers 1 and 1^b. By the time these elements have assumed their full line positions one of the idle rollers has raised the article 4^a out of contact with one of the supporting rollers 1^a or 1^b, herein shown as the roller 1^b. In the dotted line position also, the article 4^b is shown as supported by the roller 1^b and one of the idle rollers, while in the full line position the idle roller has moved downwardly between the supporting rollers 1^b and 1^c and is about ready to permit the article 4^b to contact with both the supporting rollers 1^b and 1^c. In both the dotted and full line positions the article 4^c is supported by the rollers 1^c and 1^d.

On the return traverse of the rollers they also pass successively between adjacent arms of the spiders to aid in the rotation of the frame composed of these spiders and the idle rollers in order that they may be operatively related to the articles supported on the upper stretch of the rotatable rollers. In case one of the chains 3 should fall somewhat behind the other, as for example, as shown in Figure 6, the mounting of the idle rollers as hereinbefore described permits them to assume positions parallel with the rotatable rollers between which they pass so that no interference with their operation is produced by such positioning of the supporting rollers.

Having thus described an embodiment of this invention it should be evident to those skilled in the art that various changes and modifications might made therein without departing from its spirit or scope as defined by the appended claims.

I claim:

1. In combination with a plurality of spaced rotatable rollers movable bodily in a path and arranged to convey cylindrical articles supported between adjacent pairs of rollers, of a plurality of roller-rotating mechanisms arranged along said path and into cooperative relation with which each of said rollers successively comes to rotate said articles, and means acting when one of the supporting rollers for each article passes out of cooperative relation to one of said mechanisms to hold the article out of contact with one of said pair of rollers until both the said pair of rollers are out of driven relation with said driving mechanism.

2. In combination with a plurality of spaced rotatable rollers movable bodily in a path and arranged to convey cylindrical articles supported between adjacent pairs of rollers, of a plurality of roller-rotating mechanisms arranged along said path and into cooperative relation with which each of said rollers successively comes to rotate said articles, means acting when one of the supporting rollers for each article passes out of cooperative relation to one of said mechanisms to hold the article out of contact with one of said pair of rollers until both the said pair of rollers are out of driven relation with said driving mechanism and into cooperative relation to the next succeeding driving mechanism.

3. In combination with a plurality of spaced rotatable rollers movable bodily in a path and arranged to convey cylindrical articles supported between adjacent pairs of rollers, of a plurality of roller-rotating mechanisms arranged along said path and into cooperative relation with which each of said rollers successively comes to rotate said articles, and a plurality of idle rollers constructed to move successively between adjacent rotatable rollers and raise the article supported thereby from contact with one of said rotatable rollers while said rotatable rollers are passing from one to a succeeding rotating mechanism.

4. In combination with a plurality of spaced rotatable rollers movable bodily in a path and arranged to convey cylindrical articles supported between adjacent pairs of rollers, of a plurality of roller-rotating mechanisms arranged along said path and into cooperative relation with which each of said rollers successively comes to rotate said articles, a plurality of idle rollers constructed to move successively between adjacent rotatable rollers and raise the article supported thereby from contact with one of said rotatable rollers while said rotatable rollers are passing from one to a succeeding rotating mechanism, and means for maintaining said idle rollers out of direct frictional engagement with said rotatable rollers.

5. In combination with a plurality of substantially parallel rotatable rollers arranged to support cylindrical articles between each pair of adjacent rollers, endless members connecting the adjacent ends of said rollers, means to drive said members to cause said members to be moved bodily in a closed path, a plurality of roller-rotating mechanisms with which each of said rollers successively comes into cooperative relation, a rotatable frame journaled adjacent to and between said rotating mechanisms, and idle rollers carried by said frame in position to pass between adjacent rotatable rollers and lift each article from one of its pair of rotatable rollers while said pair is passing from cooperative relation with one to the succeeding rotating mechanism.

6. In combination with a plurality of substantially parallel rotatable rollers arranged to support cylindrical articles between each pair of adjacent rollers, endless members connecting the adjacent ends of said rollers, means to drive said members to cause said members to be moved bodily in a closed path, a plurality of roller-rotating mechanisms with which each of said rollers successively comes into cooperative relation, a rotatable frame journaled adjacent to and between said rotating mechanisms, and idle rollers carried by said frame in position to pass between adjacent rotatable rollers and lift each article from one of its pair of rotatable rollers while said pair is passing from cooperative relation with one to the succeeding rotating mechanism, said frame being distortable to permit said idle rollers to assume positions with their axes inclined to the journal axis of said frame to permit said idle rollers to pass between rotatable rollers having their axes at an angle to the perpendicular to their direction of bodily movement.

7. A device of the class described, comprising a rotary shaft, a pair of spaced spiders on said shaft, each of said spiders having outwardly extending arms, and rollers extending between the extremities of the corresponding arms of said spiders and journaled for rotation.

8. A device of the class described, comprising a rotatable shaft, a pair of spaced spiders on said shaft, each of said spiders having outwardly extending arms, a wheel journaled at the end of each of said arms, and rollers extending between the corresponding arms of said spiders eccentrically of said wheels and journaled for rotation.

9. A device of the class described, comprising a rotatable shaft, a pair of spaced spiders on said shaft, each of said spiders having outwardly extending arms, a wheel journaled at the end of each of said arms, and rollers of smaller diameter than said wheels extending between the corresponding arms of said spiders and journaled for rotation.

10. A device of the class described, comprising a rotatable shaft, a pair of spaced spiders on said shaft, each of said spiders having outwardly extending arms, a wheel journaled at the end of each of said arms, and rollers of smaller diameter than said wheels extending between the corresponding arms of said spiders eccentrically of said wheels and journaled for rotation.

11. A device of the class described, comprising a rotary shaft, a pair of spaced spiders on said shaft, each of said spiders having outwardly extending arms, rollers extending between the extremities of the corresponding arms of said spiders, said spiders being permited relative angular motion on said shaft, and said rollers being journaled for free rotation between said arms irrespective of the angular relation between said spiders.

12. A device of the class described, comprising a rotary shaft, a pair of spaced spiders on said shaft, each of said spiders having outwardly extending arms, a wheel journaled at the outer end of each arm, and rollers journaled between corresponding arms of said spiders and having their peripheries extending further from said shaft than the peripheries of said wheels.

13. A device of the class described, comprising a rotary shaft, a pair of spaced spiders on said shaft, each of said spiders having outwardly extending arms, a wheel journaled at the outer end of each arm, and rollers of smaller diameter than said wheels journaled between corresponding arms of said spiders and having their peripheries extending further from said shaft than the peripheries of said wheels.

14. A device of the class described, comprising a rotary shaft, a pair of spaced spiders on said shaft, each of said spiders having outwardly extending arms, a wheel journaled at the outer end of each arm, and rollers journaled between corresponding arms of said spiders and having their peripheries extending further from said shaft than the peripheries of said wheels, said spiders being permitted relative angular movement about said shaft, and said roller journals having universal movement to permit said rollers to rotate freely with different angular relations between said spiders.

15. A device of the class described, comprising a rotary shaft, a pair of spaced spiders on said shaft, each of said spiders having outwardly extending arms, a wheel journaled at the outer end of each arm, and rollers of smaller diameter than said wheels journaled between corresponding arms of said spiders and having their peripheries extending further from said shaft than the peripheries of said wheels, said spiders being permitted a relative angular movement about said shaft, and said roller journals having universal movement to permit said rollers to rotate freely with different angular relations between said spiders.

In testimony whereof I have affixed my signature.

HIRAM A. FARRAND.